United States Patent [19]

Diehl

[11] 4,141,036
[45] Feb. 20, 1979

[54] SOLID STATE COLOR CAMERA

[75] Inventor: Max H. Diehl, Chittenango, N.Y.

[73] Assignee: General Electric Company, Syracuse, N.Y.

[21] Appl. No.: 776,173

[22] Filed: Mar. 10, 1977

[51] Int. Cl.² ............................................. H04N 9/07
[52] U.S. Cl. ................................................... 358/44
[58] Field of Search ........................ 358/44, 47, 48, 41

[56] References Cited

U.S. PATENT DOCUMENTS

| 3,908,193 | 9/1975 | Maconski | 358/47 |
| 3,982,274 | 9/1976 | Chai | 358/44 X |
| 4,065,785 | 12/1977 | Adcock et al. | 358/44 |
| 4,069,501 | 1/1978 | Yamanaka | 358/44 |

Primary Examiner—Robert L. Griffin
Assistant Examiner—Aristotelis M. Psitos
Attorney, Agent, or Firm—Richard V. Lang; Carl W. Baker; Frank L. Neuhauser

[57] ABSTRACT

The present invention relates to a solid state color camera in which a solid state imager is combined with a stripe filter and a color processor to obtain a three color electrical signal. The color filter is a composite filter consisting of a first sequence of pass and rejection stripes for one color alternating at the sensor interval and a second sequence of pass and rejection stripes for a second color alternating at twice the sensor interval. In one form of the invention, the imager is a charge injection device, scanned two sensor elements at a time to produce simultaneous but separate odd and even sensor outputs. The color processing network is coupled to these separate outputs, and uses combination, delay and sampling circuitry to obtain the three color electrical signals. The invention is applicable to other forms of solid state imagers including both charge injection and charge coupled devices and to other scanning techniques.

15 Claims, 9 Drawing Figures

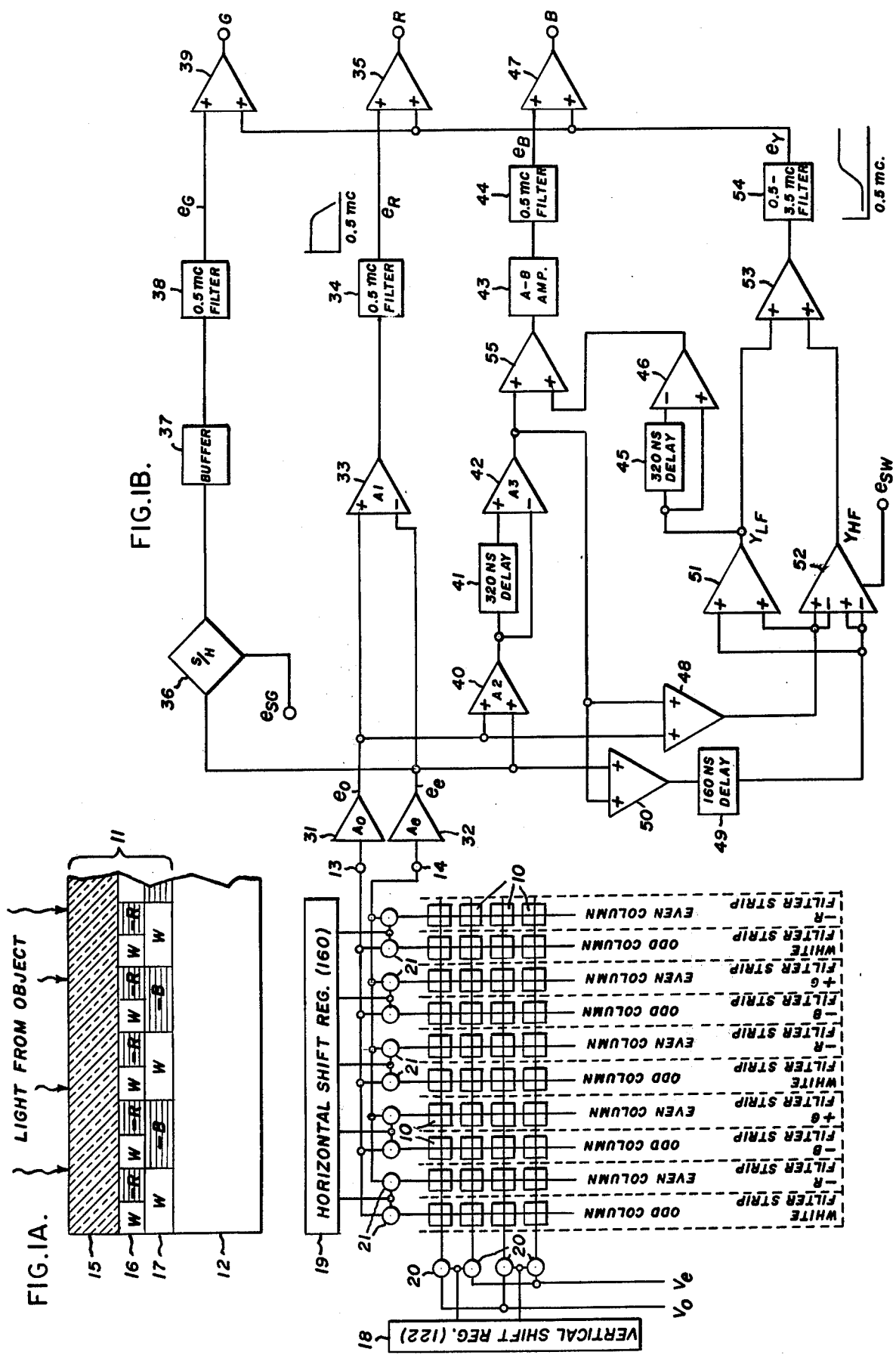

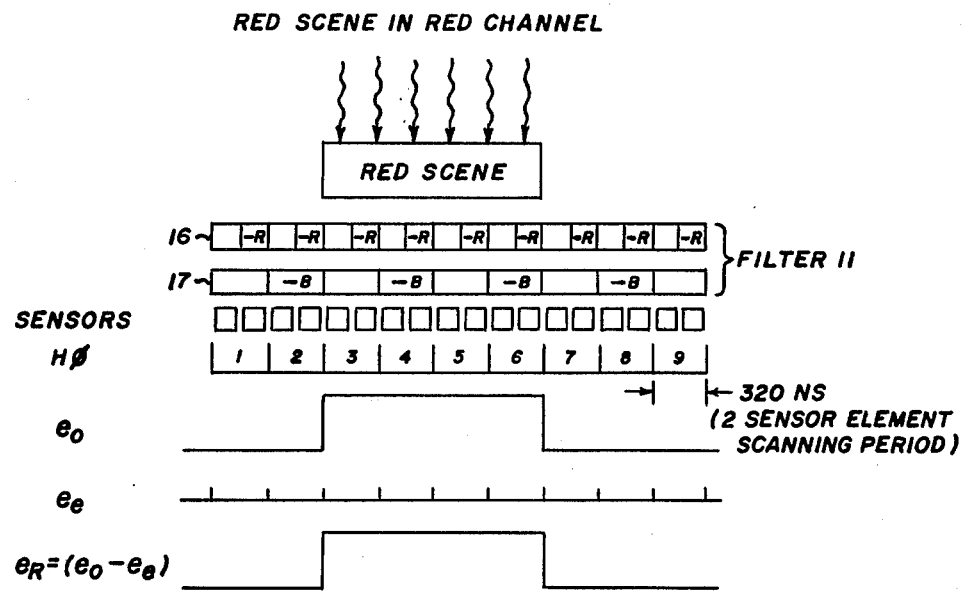
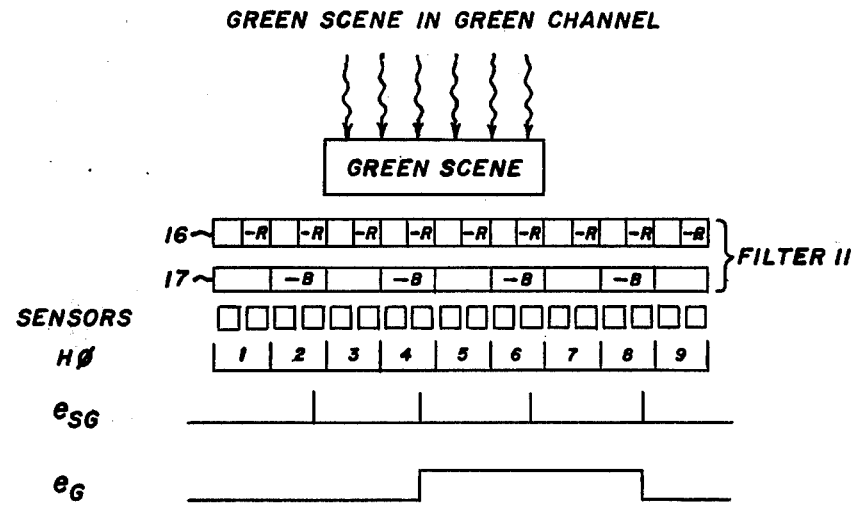

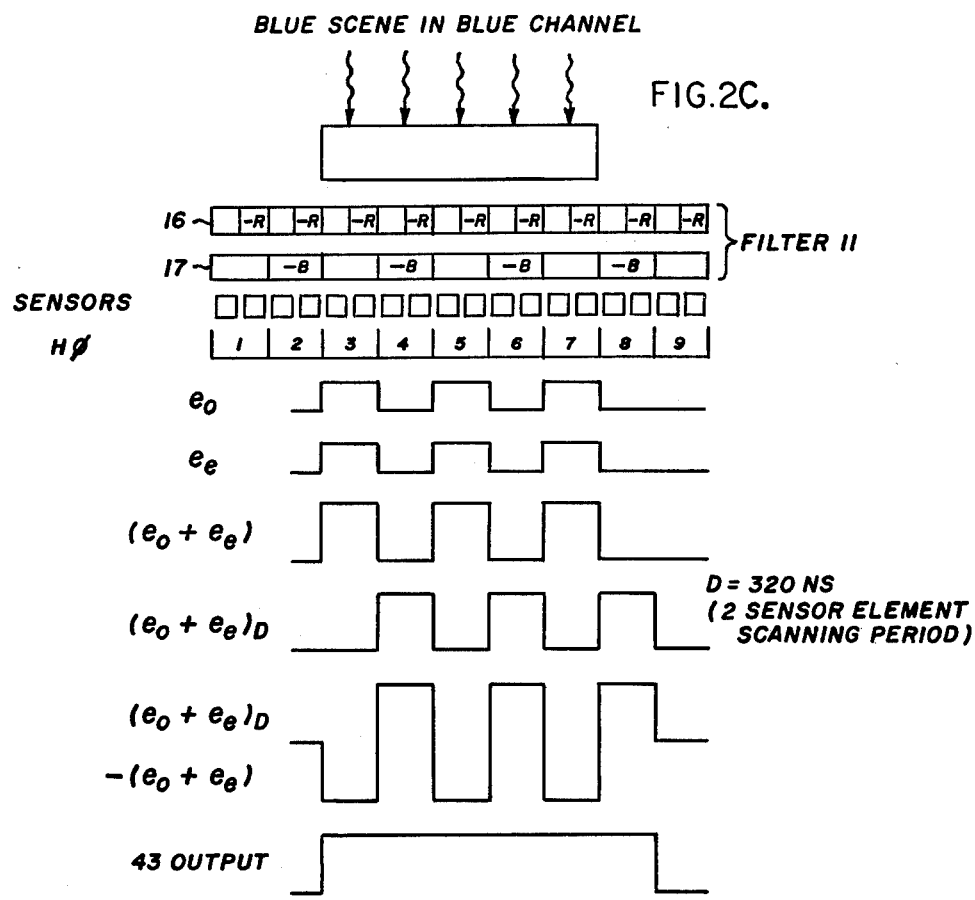
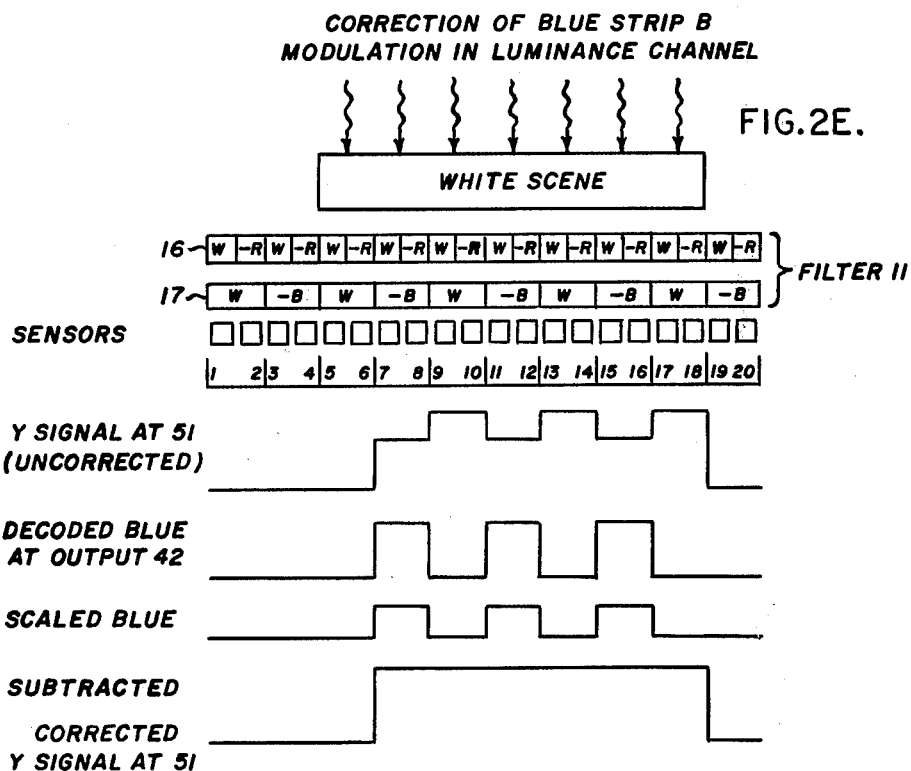

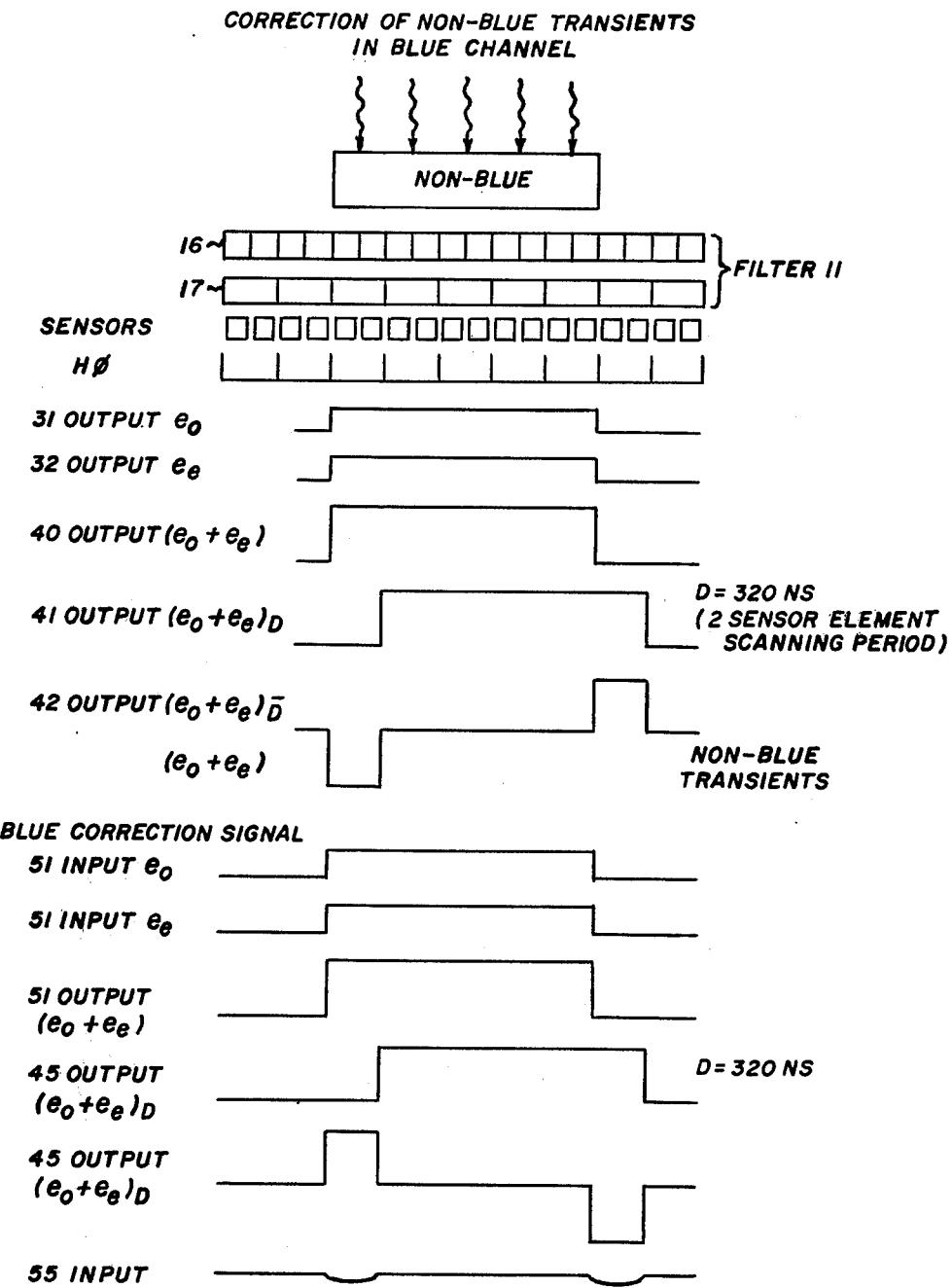

SOLID STATE COLOR CAMERA

BACKGROUND OF THE INVENTION

1. Field of the Invention

The present invention relates to a solid state imaging system and more particularly to solid state imaging systems designed to obtain video color signals. The invention further relates to color filtering and electrical signal processing necessary to obtain a three color electrical video signal.

2. Description of the Prior Art

It has been proposed to use solid state imagers for color. A rather direct approach would be to use two or three imagers deriving an image from a common scene through separate filters. The cost of solid state imagers is sufficiently high, however, to reserve this approach for applications where the expense of an added imager is permissible. In low cost applications, it is desirable to use a single imager. Such a system has been proposed in U.S. Pat. No. 3,890,500 entitled "Apparatus for Sensing Radiation and Providing Electrical Readout" to Eichelberger et al, and assigned to the present Assignee. The color system there described employs a single imager using striped filters. Individual stripes are aligned with individual sensor columns in groups of two or three. In a three color system, for instance, a red pass, a green pass and a blue pass color filter stripe are arranged in repeating sequences of three. The imager is then addressed to the red lines in one field, the green lines in a second field, and the blue lines in a third field in repeated sequences to obtain a three color signal. The above approach is of somewhat lower resolution than optimum and is field sequential.

SUMMARY OF THE INVENTION

Accordingly, it is an object of the present invention to provide an improved solid state color imaging system.

It is a further object of the present invention to provide an improved solid state color imaging system employing a single solid state imager.

It is an additional object of the present invention to provide a solid state color imaging system employing a single solid state imager and achieving improved resolution.

These and other objectives of the invention are achieved in a novel solid state color camera comprising a color filter, a solid state imager, and a color processor network. The color filter has a first succession of stripes aligned parallel to a vertical dimension and spaced at a fixed interval, the stripes alternately passing and rejecting a first primary color. Typically, the passing stripe is clear and the first color is red. The solid state imager contains an area array of image sensors, arranged in rows and columns. The columns of sensors are aligned parallel to the vertical filter dimension at the fixed filter stripe interval, and in registry with the filter stripes. Output means are provided coupled to the array for deriving signals from the individual sensors at a given periodic rate. The color processor network obtains an electrical signal corresponding to the above-mentioned primary color. It comprises a network for subtractively combining the electrical signal from a sensor beneath the first color passing stripe with the electrical signal from an adjacent sensor beneath the first color rejection stripe. The adjacent sensor subtractions are repeated throughout each row to produce a first primary color signal.

In accordance with one facet of the invention, the signals are derived sequentially by the output means from the sensor elements two elements at a time, signals from odd sensor elements being coupled to a first output terminal and signals from even sensor elements being coupled to a second output terminal. The color processor comprises a differential amplifier having one input coupled to the first output terminal and a second input coupled to the second output terminal, the output corresponding to the first color appearing at the output of said differential amplifier.

Instrumental to selecting a second (and third) color signal, the color filter has a second succession of stripes aligned parallel to the vertical dimension and spaced at double the fixed interval of the first succession. The second succession of stripes alternately passes and rejects a second primary color and forms, together with the first succession of stripes, a composite color filter having a four stripe color differentiated, repeating sequence. In the second succession, the second primary color passing stripe is clear and the second primary color rejecting stripe rejects blue. In the color processor, the second primary color signal is obtained by means for additively combining the electrical signal from the first odd and even sensors beneath the first two stripes of each four stripe sequence to form a first value and additively combining the electrical signal from the second odd and even sensors beneath the second two stripes of each four stripe sequence to form a second value. The two additions are repeated in each four stripe sequence to form an a.c. wave whose amplitude is equal to the difference between these values.

In accordance with another facet of the invention, assuming that signals are derived from odd sensor elements at a first output terminal and signals from even sensor elements at a second output terminal, the additive means of the color processor are coupled respectively to the first and second output terminals of the output means. Delay means are then provided coupled to the output of the additive means to delay the signal from each pair of sensors into time coincidence with the later signal from the adjacent following pair of sensors. Means are then provided for subtractively combining the delayed and undelayed signal to form a quantity corresponding to said second color. The quantity so formed is an ac quantity. Means are then provided for detecting the amplitude of the ac wave to obtain a voltage proportional to the second primary color.

Assuming that the first and second colors are red and blue, one position in each four stripe sequence, rejects red and blue, and effectively passes green. The color processor has a network for obtaining an electrical signal for the green primary color by sampling means, timed to select only the electrical signal from a sensor beneath the green pass position and repeating this selection in each four stripe sequence.

The processor also includes a network for obtaining a luminance signal. This network comprises means for additively combining the electrical signal from a sensor beneath a clear stripe with the electrical signal from a sensor beneath a blue rejecting stripe in the same four stripe sequence, one of the two signals being delayed prior to combination by one horizontal element scanning period. The network also comprises means for additively combining the electrical signal from a sensor beneath a blue rejecting stripe with the signal from a sensor beneath a blue and red rejecting stripe in the same four stripe sequence, one of the two being delayed prior to combination by one horizontal element scanning period. For both delays, the delay means is provided in either the path from the odd or the even sensor output terminal. The two additive combinations are repeated in each four stripe sequence to form a first luminance signal.

In accordance with other aspects of the invention, the processor is provided with a network for correction of non-blue transients in the network for obtaining a blue channel and a network is provided for correction of an undesired blue stripe modulation in the network for obtaining a luminance signal. The color processor is completed by three low pass filters provided respectively for the first, second and third color signals having a common higher frequency cut off and a filter for the luminance signal whose lower cut off frequency maches the upper cut off frequency of the first three filters. Three adders are provided for adding the luminance signal to each of the color signals. The final three color signal is available at the outputs of these three adders.

BRIEF DESCRIPTION OF THE DRAWINGS

The novel and distinctive features of the invention are set forth in the claims appended to the present application. The invention itself, however, together with further objects and advantages thereof may best be understood by reference to the following description and accompanying drawings, in which:

FIg. 1A is a side elevation view of the filter and the solid state imager which are used in the novel color imaging system herein described;

FIG. 1B is a plan view of a filter and solid state imager together with a block diagram of a color processor for separating the signals from the imager into electrical signals representing the primary color components;

FIG. 2A is a drawing illustrating the operation of the red channel of the color imaging system in converting light from a red scene into an electrical signal;

FIG. 2B is a drawing illustrating the operation of the blue channel of the color imaging system in converting a blue scene into an electrical signal;

FIG. 2C shows the operation of the blue color circuitry in treating the blue scene;

FIG. 2D is an illustration of the creation of undesired transients in the blue channel in treating a non-blue signal and their correction in a separate network;

FIG. 2E is a drawing illustrating the creation of undesired blue stripe modulation in the luminance channel and its correction in a separate network.

DESCRIPTION OF THE PREFERRED EMBODIMENTS

Figure 3A:
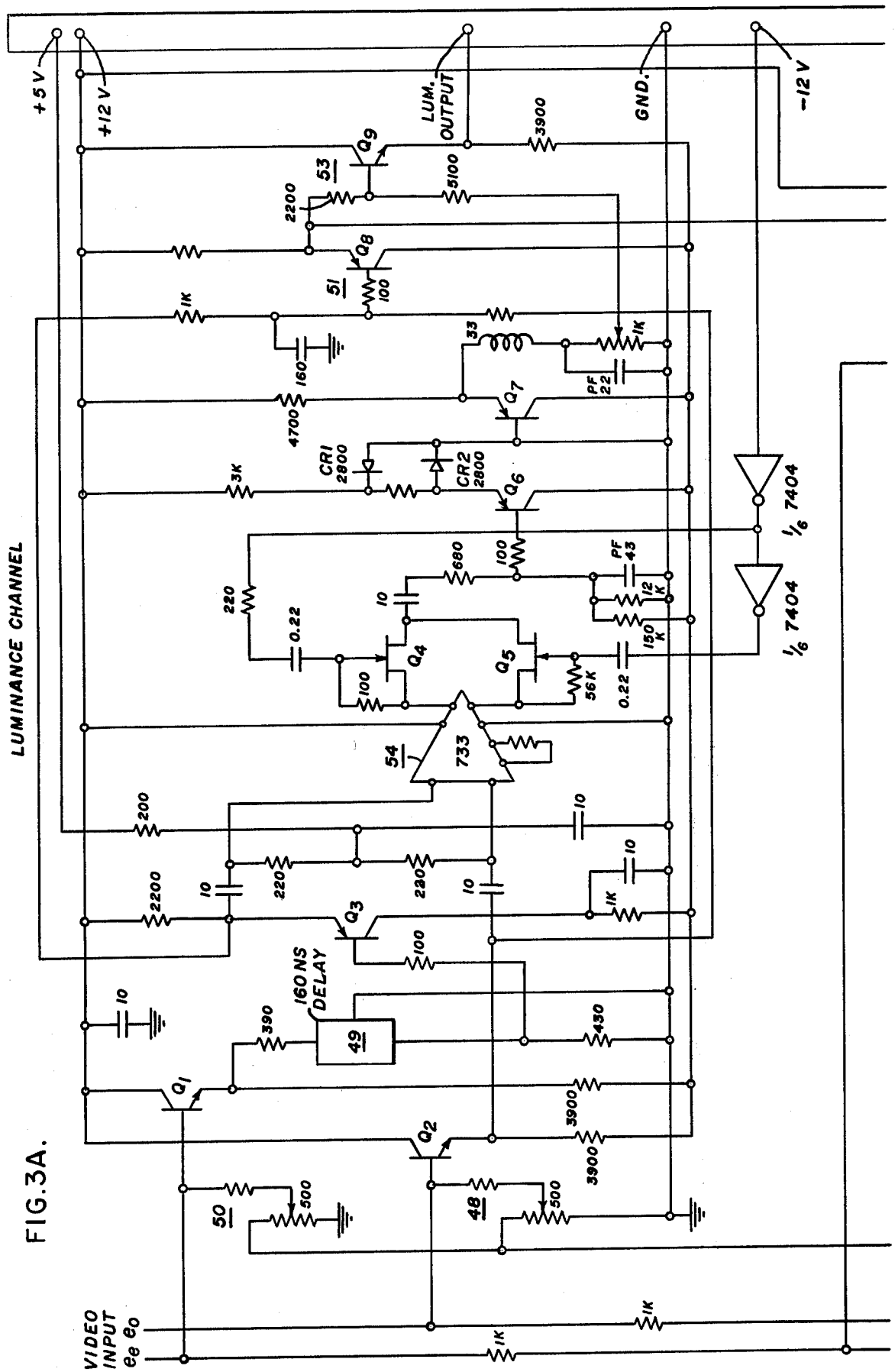
FIGS. 3A and 3B form an electrical circuit drawing of a practical embodiment of the invention omitting those portions of the color processor circuitry prior to the final filtering and the addition to each primary color of wide band luminance information.

Referring now to FIGS. 1A and 1B, a color imaging system using a single solid state imager is shown. FIG. 1A is a side elevation view of the filter and the imager. As seen in 1A, light from an object is passed through a composite color filter 11 prior to impingement on the surface of the solid state CID (charge injection device) imager 12 upon which an image is focused. FIG. 1B is a plan view of the imager, together with a block diagram of a color processor. As seen in 1B, the imager 12 contains a rectangular array of image sensors 10. The imager is coupled to a scanning generator (not shown) which controls the conversion of the information on the sensor array into a pair of time variant electrical signals ($e_o$, $e_e$) at two imager output terminals 13 and 14. The processor to which the signals from the imager are applied is shown in block diagram form and comprises the blocks 31-55. The function of the processor is to separate the signals from the imager into three color components, typically, R, G and B.

The composite color filter 11 is illustrated in both FIGS. 1A and 1B. As seen in FIG. 1A, the filter is seen to consist of a supportive glass substrate 15 upon the undersurface of which are formed two layers 16 and 17. These layers are shown somewhat artificially as being of uniform thickness and with a thickness in relation to the thickness of the glass substrate which is much greater than in actuality. The first layer 16 consists of an alternating series of clear (marked w) and red excluding (marked $-R$) strips. The other (or lower) layer 17 consists of an alternating series of clear (marked w) and blue excluding (marked $-B$) strips at one half the spatial frequency of the upper layer. The composite effect of the two layers is to form a filter 11 in which the filter function occurs in recurring sets of four; one member of the set being clear w, one member of the set excluding red $-R$, one member of the set excluding blue $-B$, and one member of the set excluding red and blue $-R$, $-B$ and approximating a filter passing green $+G$. The alignment of the composite color filter in respect to the array of optical sensors on the imager, is best understood in connection with the plan view of the imager.

The CID imager 12 includes vertical 18 and horizontal 19 shift registers and vertical 20 and horizontal 21 enable gates which assist in scanning the image focused on the sensor array. In a typical arrangement, the imager consists of an array of optical sensors with 244 in the vertical dimension by 320 in the horizontal dimension, all integrated on a common substrate. Each sensor element 10 in the array has two terminals, one of which is associated with vertical selection and the other of which is associated with horizontal selection. The "vertical" terminals are interconnected in buses which extend in the horizontal dimension and which are spaced along the vertical dimension. These buses are called "rows". The horizontal terminals are interconnected in buses which extend in the vertical dimension and which are spaced along the horizontal dimension. These buses are called "columns".

The rows are selected one row at a time by a vertical enabling pulse acting in conjunction with a vertical pulse upon a two input, enable gate 20 (also integrated). The vertical shift register 18, which is integrated on the common substrate, has 122 stages, each of which is coupled to a pair of enable gates 20. An enable pulse, which lasts for a "field" turns "on" the first input of the first gate of all the pairs of vertical enable gates. As the vertical pulse is propagated along the vertical shift register, its presence at each stage in conjunction with the enabling pulse turns on the first of each pair of vertical enable gates. When all "odd" rows have been sampled to complete one field, a second vertical enable pulse turns on the second of each pair of vertical enable gates. As the next vertical pulse is propagated down the vertical shift register 18, the second of each pair of vertical enable gates 20 is turned on. The result is a selection of odd sensor rows in a first field and even rows in the second field.

Once a row has been selected at the slower vertical rate, it is scanned rapidly at the faster horizontal rate. The sensor elements are arranged in the horizontal dimension in 160 odd and 160 even "columns". The columns are selected one pair at a time by a horizontal pulse propagated along a 160 stage shift register 19, also integrated on the common substrate. Each stage of the horizontal shift register is coupled to a pair of horizontal enable gates 21 (also integrated). Each horizontal enable gate controls a column of sensors, the odd gate of the pair coupling the sensor element to an odd $e_o$ video signal output and the even gate of the pair coupling the sensor element to an even $e_e$ video signal output. As the horizontal pulse is propagated along the horizontal register, consecutive adjacent pairs of sensor elements are "enabled", producing a simultaneous pair of odd $e_o$ and even $e_e$ video output signals at the respective output terminals of the array.

The sensor array is scanned in the following manner. The scanning generator, acting through the vertical shift register 18, selects a pair of rows. The first row in that pair and the following pairs is activated by a vertical enabling pulse, and the horizontal shift register 19 steps along the row, two adjacent horizontal elements at a time. In succession, the first row of the second pair of rows, i.e. row 3, which is also activated by the enabling pulse, is scanned followed in succession in each of the odd rows until the first field is completed. After the first field is completed, the vertical enabling pulse now enables the second row of the first pair of rows and the second row of all the following pairs of rows. In succession, the second, fourth and all the even rows are scanned until the second field is completed. The process of scanning the odd rows is then repeated for the third field, etc.

As previously noted, the filter 11 is critically aligned in respect to the image sensors 10 of the imager 12 as shown in the plan view of FIG. 1B. The light sensitive areas of the optical sensors are shown as small squares typically spaced on centers at 0.0012 inch intervals. The light sensitive area of the array, assuming a 320 column by 244 row array, is approximately 0.4 inches by 0.3 inches. The long dimension of the filter strips are arranged parallel to and in precise registry with the sensor columns. In particular, the first clear or w strip of the filter is superimposed upon the leftmost column of sensors. The second red rejecting strip of the filter is superimposed upon the second column from the left. The third, blue rejecting strip of the filter is superimposed upon the third column of sensors. The fourth, or green, passing strip of the filter is superimposed upon the fourth column of sensors from the left. The filter contains a repeating succession of strips in similarly ordered sets of four throughout the remainder of the 320 columns.

It is normally preferable for the filter to be placed in close proximity to the sensor array to avoid the need for any additional lenses. The camera lens, which is not shown, may have a numerical aperture between 1 and 2, leading to a focal length of less than one inch with a sensor array of the indicated size. With a focal length this short, the filter must be in close proximity to the sensor elements for color accuracy. Close proximity is achieved by placing the filter layers 16 and 17 on the undersurface of the filter substrate, and attaching the undersurface of the filter 11 directly to the upper surface of the CID imager. Alternatively, the filter may be formed on the upper surface of the CID imager.

The color processor for converting the imager output into separate electrical signals for the R, B and G color components is shown in both the block diagram of FIG. 1B and the detailed circuit diagram of FIG. 3. The color processor, as will be explained, cooperates with the striped filter in deriving the individual electrical color signals. The red information is contained in alternate sensors in which the "clear" sensors are alternated with those beneath a red rejecting stripe. This filtering is set by filter layer 16. The stripe system limits the bandwidth available to red information to a spatial frequency of one-half the sensor interval. The blue information is contained in sets of four sensors in which two adjacent sensors beneath the clear band of filter layer 17 act in alternation with two adjacent sensors beneath the blue rejecting stripe of filter layer 17. The stripe interval of filter layer 17 limits the blue information bandwidth to a spatial frequency of one-quarter the sensor interval. Green and approximate luminance information on the other hand is available at the outputs of all sensors, and the bandwidth is not limited by the periodicity of the stripes. In obtaining the green signal a sample is used, however, which makes a sample once in every four stripes, and thus limits the bandwidth of the green information to the same bandwidth as the blue. In practice, the bandwidth available to each color component as a function of this stripe and the decoding process is restricted to 0.5 megahertz by a following electrical filter. The reduced bandwidth in the individual color channels produces negiligble net loss in system resolution since high frequency luminance ($Y_{HF}$) information is re-introduced into each color channel in frequencies above those used in the individual color channels. The reintroduction is made in appropriate proportion to maintain its true nature as luminance information (Y) as a final stage in formation of the individual color signals (Y = 0.59G + 0.3R + 0.11B).

Referring again to FIG. 1B for a consideration of the blocks of the color processors, the outputs $e_o$, $e_e$ from the imager are applied to an odd 31 and an even 32 video preamplifier which are the input elements of the processor. The preamplifiers 31 and 32 are normally accompanied by noise cancellers, low pass filters, and sampling circuitry (not illustrated) designed to reduce pattern noise and to increase the signal to noise ratio. The output from the preamplifiers 31, 32 and any other input circuitry is then distributed to four (generally separate) channels including three color channels and a luminance channel. In the illustrated embodiment, the blue and luminance channels are twice inter-connected to provide two corrections, and finally the luminance is re-introduced into each color channel as a last stage in the processing to form the output into a conventional three color format.

The electrical signal corresponding to the red color component is derived from the outputs of the odd and even video preamplifiers 31 and 32 by the blocks 33, 34 forming the red color channel. The operation of these blocks in treating a red color bar is illustrated in FIG. 2A. Referring initially to FIG. 1B, the block 33 is a differential amplifier having one positive (+) input coupled to the output of the odd video preamplifier 31, and the other, or negative (−) input coupled to the output of the even video preamplifier 32. The difference $e_o - e_e$ is then passed through a low pass filter 34, having an upper limit of 0.5 megahertz, and then applied to one input terminal of the adder 35. The luminance signal, whose derivation will be described subsequently, is applied to the other terminal of the adder 35. A red color signal having a bandwidth appreciably enhanced by the addition of the luminance information is available at the output terminal of the adder 35.

In short, the electrical signal corresponding to the red color component is obtained in the red channel by a subtraction of the even $e_e$ from the odd $e_o$ imager signals to obtain a low resolution red signal followed by the addition of a luminance signal to obtain a high resolution red signal. An understanding of the first stage of this operation may be gathered from a consideration of FIG. 2A. In FIG. 2A, a red scene is illustrated above the strip filter layers 16 and 17. The red scene is focused through the filter upon the sensors in columns numbered 5 through 12. The output $H_\phi$ of the horizontal shift register is shown, producing pulses 3 through 6 in coincidence with the red scene. Under these circumstances, the odd imager signal, corresponding to that derived from sensor elements 5, 7, 9 and 11, produces a 1 output for each red illuminated element. Taking up each of these four odd sensor elements separately: in sensor element 5, the red light from the object passes through the clear sections of filter layers 16 and 17 to produce a first "1" output; in sensor element 7, the red light passes through the clear section of filter layer 16 and the blue trap of filter layer 17 to produce a "1" output; in sensor element 9, the red light passes through two clear sections of the filter layers to produce a "1" output; and in sensor element 11, the red light passes through a clear and blue trap section of the filter layers to produce a "1" output. The odd sensor output for the same red scene is shown at $e_o$. Under these circumstances, the even column imager signal, and in particular sensor elements 6, 8, 10 and 12, within the red scene produce no output. In sensor element 6, the red light from the object impinges on the red trap of the first filter layer 16, and produces a zero output. The red traps in the filter layer 16 at the eighth, tenth and twelfth sensor positions produce a similar zero output. The even sensor waveform for a red scene is shown at $e_e$ in FIG. 2A. When the two waveforms are subtracted in differential amplifier 33, the red signal $e_r$, illustrated in FIG. 2A, is produced.

The foregoing process by which the outputs of two adjacent elements are subtractively combined to obtain one sample of red information, in effect sets a requirement of two adjacent sensor elements for each red picture element. The maximum available spatial frequency and thus the bandwith for the red information is one-half the sensor interval.

The electrical signal corresponding to the green component is derived from the output of the even video preamplifier 32 by the blocks 36, 37, 38 and 39 forming the green signal. The operation of these blocks in treating a green color bar is illustrated in FIG. 2B. Referring initially to FIG. 1B, the block 36 is a sample and hold circuit whose input is coupled to the output of preamplifier 32. The sampling function is controlled by a green sampling waveform $e_{sg}$ at half the frequency of the horizontal clocking frequency. The hold function is designed to provide a sustained output between sampling pulses. As will be explained below, the sampling pulse is timed to select the output from the fourth, or green pass section of each four strip filter set. The output of the hold circuit is supplied to a buffer amplifier 37, passed through a low pass filter of 0.5 megahertz to one terminal of the adder 39. The luminance signal is applied to the other terminal of the adder 39. A high resolution green color signal, as a result of the addition of the luminance information, is available at the output terminal of the adder 39.

As noted above, the electrical signal corresponding to the green component is obtained in the green channel by sampling the even $e_e$ imager signal to obtain a low resolution green signal followed by the addition of a luminance signal to obtain a broadband green signal. A green scene as illustrated in FIG. 2B may be referred to to explain the first stage of this operation. A green scene is illustrated in FIG. 2B above the strip filter layers 16 and 17. The green scene is focused through the filter upon the image sensors numbered 5 through 12. The output of the horizontal shift register ($H_\phi$) is shown producing pulses 3 through 6 in coincidence with the green scene. As described earlier, the super-position of a red rejection (−R) and a blue rejection (−B) filter produces a green pass (+G) filter. The green pass occurs in the fourth element of each four strip set and thus occurs once every four elements. In the example, the filter produces a green pass indicating a "1" output at sensor positions 8 and 12. Signals indicating illumination would also be produced, from illumination, whether green or not, falling on the clear sections of each filter set, corresponding to sensor positions 5 and 9. Similarly, "1" output signals would be produced at the sensor positions 6 and 10, corresponding to the red trap, whether blue or green light were applied. Finally, light indicating output signals would be produced at the sensor positions 7 and 11 corresponding to the blue trap, whether red or green light was applied. To select only the green information, only the fourth section of each filter set is read. The green is selected by a sampling and hold circuit 36 controlled by a sampling pulse ($e_{sg}$). As illustrated, the green sampling pulse ($e_{sg}$) is designed to sample at half the horizontal clocking rate, corresponding to every fourth sensor element, and in particular to sample the alternate even sensor elements 4, 8, 12, and 16 under the green pass filters. Assuming a green scene at sensor elements 5 through 12, samples will occur at sensor elements 8 and 12. With the indicated four element holding period, the output waveform $e_g$ appears at the output of the hold portion of the circuit at a time corresponding to sensor elements 8–15. The green output in this example is delayed some three elements. The green information, while available at all four stripes in each four stripe set, is exclusively available in only the fourth stripe of each set. The process of taking a sample every fourth stripe to obtain the narrow band green information thus derives information at a spatial frequency equal to one-fourth the spatial frequency of the sensors. The low resolution green ($e_g$), after buffering in element 37 and filtering in 38 is then combined with the luminance signal.

The electrical signal corresponding to the blue color component is derived from the outputs of the odd and even video preamplifiers (31 and 32) by the blocks 40 to 47 and 55 forming the blue channel. The operation of these blocks in treating a blue scene is illustrated in FIG. 2C. The creation of a false blue transient from non-blue light, and its correction by blocks 45 and 46 is illustrated in FIG. 2D. Treatment of non-blue light will be deferred. As shown in FIG. 1B, the outputs of the video preamplifiers are coupled to the separate inputs of the adder 40. The adder output is then separated into a first part, which is applied to the two sensor element delay (320 nanosecond) 41, and an undelayed second part. The delayed and undelayed outputs are then applied respectively to the positive and negative input terminals of the differential amplifier 42. The difference from 42 is then coupled to one input of an adder 55 to the other input of which a blue correction signal from the luminance channel via blocks 45 and 46 is added. In the blue channel, one picture element of blue information is available in each set of four sensors, assuming the signal derivation process noted. The sum appearing at the output of 55 is coupled to the absolute value amplifier 43. The absolute value amplifier, which is a wide band rectifier, recovers the peak amplitude of an applied ac waveform. The rectified output from 43 is filtered in low pass filter 44 and supplied to one terminal of the blue adder 47. The luminance signal is added to the other terminal of the adder 47. A high resolution blue color signal as a result of the addition of the luminance information to the low resolution blue signal is available at the output terminal of the adder 47.

The operation of the blue color circuitry in treating the blue scene is illustrated in FIG. 2C. As seen in FIG. 2C, the blue scene is focused through the filter 11 upon the sensors 5 through 14 corresponding to timing intervals ($H_\phi$) 3 to 7. The odd imager signal ($e_o$), corresponding to that derived from sensor elements 5, 7, 9, 11 and 13 produces a $1+0+1+0+1$ output. In particular, in sensor element 5, the blue light passes through the clear sections of filter layers 16 and 17 to produce a "1" output. In sensor element 7, the blue light passes through the clear section of filter layer 16, but is trapped in the blue trap of filter layer 17 to produce a "0" output. In sensor element 9, the blue light passes through two clear sections of 16 and 17 to produce a "1" output, and in 11, the blue trap in layer 17 produces a "0" output. In sensor element 13, the sequence begins again with $+1$. The illustrated $e_o$ waveform is the net result. Under the same circumstances, the even imager signal ($e_e$), corresponding to that derived from sensor elements 6, 8, 10, 12 and 14 also produces a $1+0+1+0+1$ output. Adding $e_o$ to $e_e$ in the adder 40 produces the $2+0+2+0+2$ waveform labelled ($e_o + e_e$). The next waveform ($e_o + e_e$)d illustrates the effect of a two element delay in block 41. The undelayed ($e_o + e_e$) and delayed ($e_o + e_e$)d waveforms are then subtracted in 42 to obtain a $(+2-2+2-2+2-2)$ ac waveform. After addition of a blue correction in adder 55, this ac waveform is then applied to the absolute value amplifier 43. The absolute value amplifier 43 produces a dc value of twice the original signal, corresponding to the illustrated double amplitude "ac" excursions. The dc output is filtered in 44 and combined with the luminance in blue adder 47 to produce a higher resolution blue signal.

The luminance channel and its operation will now be discussed, deferring until last, a consideration of the two correction networks, which supply corrections to both the blue and the luminance channels.

The electrical signal corresponding to the luminance component is derived from the outputs of the odd and even video preamplifiers (31 and 32) by the blocks 48 to 54 forming the luminance channel. The correction circuitry for the luminance channel comprises the blocks 48 and 50. The operation of the luminance channel is not specifically illustrated, except in respect to the correction of blue stripe interference, which is illustrated in FIG. 2E. As shown in FIG. 1B, the output of the odd video preamplifier 31 is coupled through the adder 48, to an input terminal of the adder 51. The output of the even video preamplifier 32 is coupled successively through an adder 50 and through the one sensor element delay (160 nanoseconds) 49 to a second input terminal of the adder 51. The output of the adder 51 is coupled to a first input terminal of the luminance adder 53. The even sensor output, which is delayed in delay element 49, is also coupled to a first pair of input terminals of a switching differential amplifier 52. The odd video preamplifier output at the output of the adder 50 is coupled to the other pair of input terminals of the switching differential amplifier 52. The switching waveform applied to the differential amplifier is designed to provide output inversion at the sensor element rate (i.e., sensor element 1 is $+$; $2-$; $3+$; $4-$; etc.). The outputs of blocks 51 and 52 are then combined at the input terminals of the luminance adder 53. (Also coupled to the output of the block 51 is an input connection to the blue transient correction circuitry 45, 46.) A high resolution luminance signal, subject to blue stripe interference, appears at the output of the adder 53. The luminance signal is then coupled to a filter 54 which passes only luminance information between 0.5 and 3.5 megahertz. The filtered output is coupled to the inputs of each of the adders 39, 35 and 47 to form the high resolution G, R and B color signals.

The luminance channel, (neglecting error correction), uses a known branched circuit for preserving the bandwidth of the luminance information in combining the odd and even video signals. The adder 51, in combining the delayed even and undelayed odd signal, blurs transitions and in effect attenuates the higher frequency information in the video signal. It produces the low frequency luminance information ($Y_{LF}$). This "blurring" may be explained as follows: Let us assume that a transition or picture edge, for instance going from black to white, occurs at some element in the array. The odd channel signal $e_o$ produces a step between a pair of array sensors at this transition. Similarly, the even channel signal $e_e$ produces a step. Because of the delay in the delay element 49, the even channel signal shows the same step delayed one horizontal element. The result is a sloping, two step transition as opposed to a steep, single step transition. It is evident that the two steps can not be coincident because of the delay of one signal in relation to the other. The same effect is present when the reverse transient occurs.

An analysis of the waveshapes of the transition shows that if a pulse representing the difference between $e_o$ and $e_e$ delayed is added in proper polarity to the summed signal, that the steepness of both transitions can be restored and the "blurring" eliminated. This is achieved by the switching inverter 52, which forms the high frequency luminance branch ($Y_{HF}$). A differential amplifier, which forms the input element of 52, produces a pulse which is equal to the signal difference at each transition. The "difference" pulse is coupled to a controlled phase inverter forming a second element within 52. The phase is controlled by the switching waveform ($e_{sw}$) at twice the horizontal clock rate. If the edge of the transition occurs between unpaired line elements in the row, the phase inverter produces an inverted signal. If the edge of the transition occurs between paired line elements in a row, the phase inverter produces a noninverted output. The correction pulse, (i.e., the high frequency luminance information) is combined in the luminance adder 53.

A first result of the double combination of the even and delayed odd signals, in which both sum and differences are used, is to preserve the full video spectrum without high frequency attenuation. The second result of the combination is a 3 dB improvement in signal to noise ratio.

The operation of the two correction networks will now be explained. The blue correction network is designed to correct a false blue signal which arises in the blue channel on the transients of a non-blue signal. The false blue correction network consists of a two sensor element delay 45 (320 nanoseconds) and a differential amplifier 46. The first input terminal of the differential amplifier 46 is coupled to the output of the luminance adder 51 in the low frequency branch. The second input terminal of the differential amplifier 46 is coupled through the two sensor element delay 45 to the output of the luminance adder (51). The differential output from 46 is coupled to the input adder 15, whose output is coupled with the input of the absolute value amplifier 43. The adder 55 is typically a resistance matrix. The result of the addition is to cancel a transient which appears in the blue output at both leading and trailing edges of a non-blue signal.

How the false blue transient arises in the blue channel and its correction is explained with reference to FIG. 2D. Assuming similar conditions as in FIG. 2C, except that the scene is now green, the odd outputs ($e_o$) at preamplifier 31 are all "1's" and the even outputs ($e_e$) at preamplifier 32 are all "1's". The summed waveform ($e_o + e_e$) at the output of adder 40 is all "2's". When the summed waveform is delayed and subtracted from the delayed summed waveform at the output of differential amplifier 42, the non-blue (i.e., green) produces a generally "0" output in the blue channel except for a $-2$ pulse at the beginning and a $+2$ pulse at the end of the color bar. This is the false blue signal which requires correction. The function of the blue correction circuit 45 and 46 is to remove these transients by adding an equal and opposite signal at the input to the absolute blue amplifier 43. Neglecting the delay in element 49, the $e_e$ waveform is applied to one input of luminance adder 51, and the $e_o$ waveform is applied to the other input of adder 51. When the two are added, a double amplitude waveform ($e_o + e_e$) is produced. If this waveform is delayed in 45 by two elements, the waveform ($e_o + e_e$) d is formed. If the delayed waveform is subtracted from the undelayed waveform, the blue correction is generated. A comparison between the false blue signal and the blue correction signal, shows that if the two are added, the sum produces a corrected signal. The correction network is not substantially affected by the delay in element 49 and does produce an approximate cancellation of the non-blue transients. The correction is normally optimized by adjustment of the magnitude of the correction waveform.

The second correction is introduced into the luminance channel to remove blue stripe interference. This interference occurs at the same frequency as the blue stripe in the filter layer 17. This luminance correction is provided by the adders 48 and 50, which each have one input coupled into the output of the blue channel differential amplifier 42. By this connection, a signal is derived from the blue channel, and added to the odd and even preamplifier outputs in the adders 48 and 50 at the input of the luminance channel.

Figure 3B:
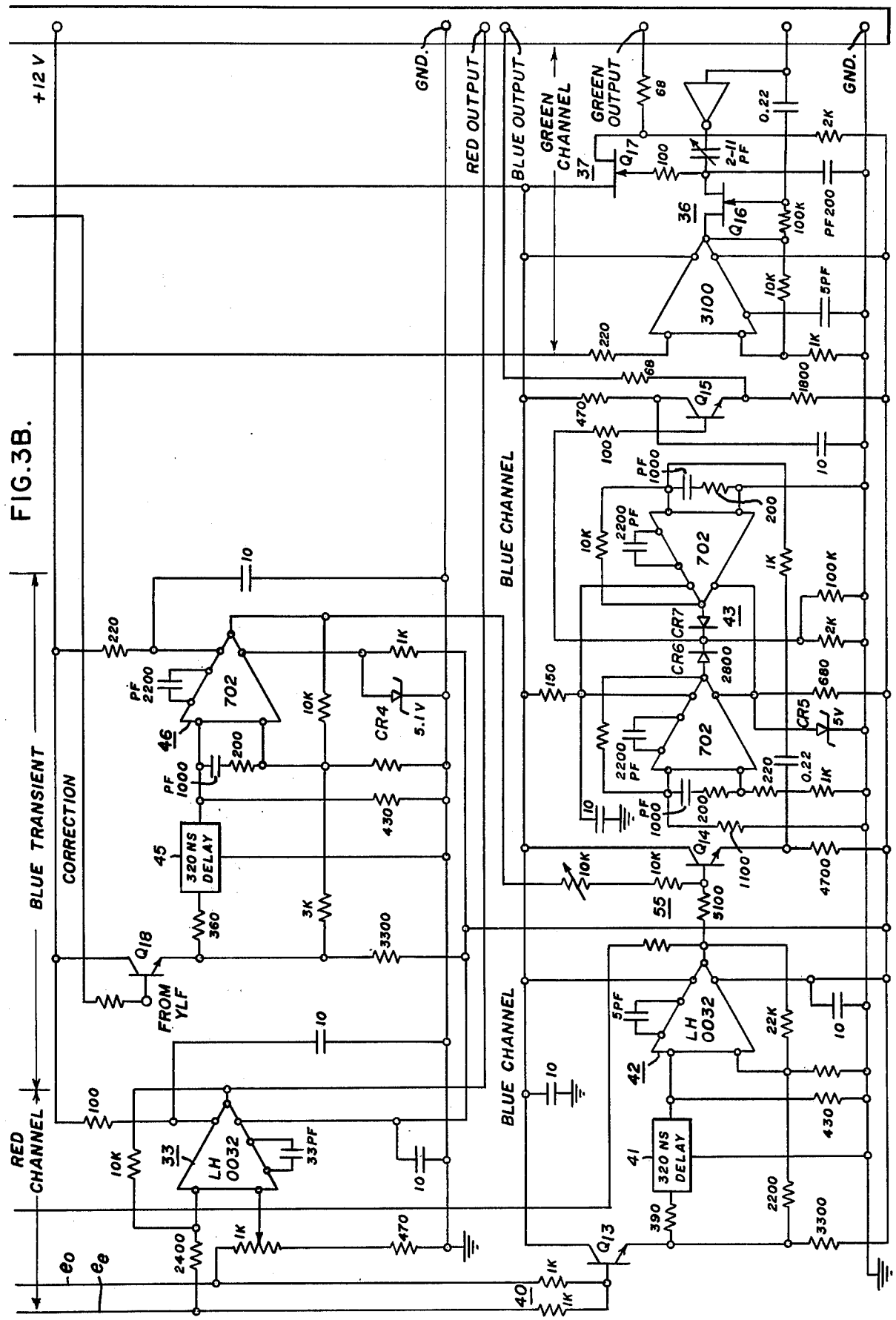

The nature and correction of the blue stripe interference may be explained with reference to FIG. 2E. In FIG. 2E, a white bar is shown focused through the filter upon the sensor elements 7 and 18. The white signal in the luminance channel experiences an attenuation at sensor elements 7, 8, 11, 12 and 15, 16 due to the periodic blue attenuation of the blue absorption stripe in filter layer 17. Assuming no correction, the white signal will produce a luminance signal (Y uncorrected) containing periodic fluctuations at the spatial frequency of the blue filter (as illustrated). The correction is provided by deriving a blue signal from the blue channel in its a.c. form and prior to rectification in the absolute value amplifier. The decoded blue waveform, which has the desired periodicity, is then taken in appropriate phase (normally inverted) and scaled to form a blue correction waveform at the input adders to 48, 50. When added to the separate odd and even channel signals, the luminance signal is corrected as illustrated. The correction is accurate in non-transient portions of the white signal. A practical circuit diagram of the color processor is shown in FIGS. 3A and 3B. The design is a solid state design using both discrete semiconductors and integrated circuits. The circuit diagram generally contains legends in parenthesis indicating the block in FIG. 1 in which the circuit elements are formed. In particular, in the green channel, the sample and hold circuitry (block 36, FIG. 1) includes the integrated circuit (Z9) and the FET Q16. The buffer 37 in FIG. 1 includes the FET Q17. In the red channel, the differential amplifier 33 in FIG. 1 is the integrated circuit Z3. In the blue channel, the input adder 40 of FIG. 1 is formed by the resistances R78 and R79 in conjunction with Q13; the delay line 41 of FIG. 1 is DL4; the differential amplifier 42 of FIG. 1 is the integrated circuit Z5; the adder 55 of FIG. 1 are the resistors R88, R89, R90 and Q14; the A·B amplifier 43 of FIG. 1 are the integrated circuits Z7 and Z8. In the luminance channel, the adder 48 of FIG. 1 is the resistor R7 and the associated adjustable resistor and transistor Q2; the adder 50 are the resistors R4 and R5 and transistor Q1; the delay line 49 of FIG. 1 is the delay line DL-1; the sampler 52 of FIG. 1 is the integrated circuit Z1 and FETs Q4 and Q5; the adder 51 of FIG. 1 are the resistors R31, R32, R120 and transistor Q8; the adder 53 of FIG. 1 are the resistors R34 and R35 and transistor Q9.

The present arrangement represents a near optimum utilization of the resolution available in a given solid state imager. Neither the filter nor the color processor reduce that resolution. The use of two band rejection filters (as opposed to three band pass filters) set at the narrow bands of red and blue is consistent with a wide band treatment in the imager output of green or luminance. The use of two spatial frequencies; the higher for the red rejection filter and the lower for the blue rejection filter, provides both the ease in separation of the electrical signals noted earlier, and gives an optimum distribution of the available information. One needs less red, and even less blue resolution to achieve a color display currently thought to be optimum. The green is unstopped in all sections of the color filter, and the same is approximately true in respect to the luminance. In short, the color filters preserve the available resolution. The color processor also is designed to preserve both the chromatic content and the high resolution luminance information. This is achieved by the use of separate narrow band primary color channels which are supplemented by the addition of luminance information of higher bandwidth.

In the illustrated embodiment, the horizontal scanner selects sensors two at a time at a typically 320 nanosecond interval. Later on, the color processor combines the information from the odd and even sensors in each pair and allocates a 160 nanosecond interval to each sensor in the consolidated electrical output signal. The delay lines 41 and 45 have a 320 nanosecond delay corresponding to the horizontal scanning interval or twice the period allocated to each horizontal sensor element. The delay line 49 has a 160 nanosecond delay corresponding to one half the horizontal scanning interval or the period allocated to each horizontal sensor element.

While the inventive embodiment has been shown using a charge injection imaging device having simultaneously scanned paired outputs, it should be evident that the inventive principles are equally applicable to other kinds of imaging devices. For instance, these principles are also applicable to charge injection devices in which the scanning is done in an element by element sequential fashion or to charge coupled devices.

What is claimed as new and desired to be secured by Letters Patent of the United States is:

1. A solid state color camera comprising:
   A. a color filter having a first succession of stripes aligned parallel to a vertical dimension and spaced at a fixed interval, said stripes alternately passing and rejecting a first color,
   B. a solid state imaging device including:
      (1) an area array of image sensors, arranged in rows and columns, said columns of sensors being aligned parallel to said vertical filter dimension at said fixed filter stripe interval, and in registry with said filter stripes, and
      (2) output means coupled to said area array for deriving signals from said individual sensors at a given periodic rate, and
   C. a color processor coupled to said output means for obtaining an electrical signal corresponding to said first color comprising a network for subtractively combining the electrical signal from a sensor beneath a first color passing filter stripe with the electrical signal from a succeeding adjacent sensor beneath a first color rejection stripe and repeating said adjacent sensor subtractions in each adjacent pair throughout said row.

2. A solid state color camera as set forth in claim 1 wherein said first color passing stripe is clear and said first color rejecting stripe rejects red.

3. A solid state color camera as set forth in claim 1 wherein
   A. the signals are derived sequentially by said output means from said sensor elements two elements at a time, signals from odd sensor elements being coupled to a first output terminal and signals from even sensor elements being coupled to a second output terminal, and wherein
   B. said color processor comprises a differential amplifier having one input coupled to said first output terminal and a second input coupled to said second output terminal, the output corresponding to said first color appearing at the output of said differential amplifier.

4. A solid state color camera as set forth in claim 1 wherein
   A. said first color passing stripe is clear and said first color rejecting stripe rejects red,
   B. said color filter has a second succession of stripes aligned parallel to said vertical dimension and spaced at double said fixed interval, said second succession of stripes alternately passing and rejecting blue, and forming together with said first succession of stripes a composite color filter having a four stripe color differentiated, repeating sequence wherein one position in each four stripe sequence rejects red and blue, and effectively passes green, and wherein
   C. said color processor comprises a network for obtaining an electrical signal corresponding to green which selects only the electrical signal from a sensor beneath said green pass position, repeating said selection in each four stripe sequence.

5. A solid state color camera as set forth in claim 4 wherein
   A. the signals are derived sequentially by said output means from said sensor elements two elements at a time, signals from odd sensor elements being coupled to a first output terminal and signals from even sensor elements being coupled to a second output terminal, and wherein
   B. said color processor comprises a sampler having its signal input coupled to one of said output terminals and controlled to sample alternate signals to sample every fourth sensor.

6. A solid state color camera as set forth in claim 1 wherein:
   A. said color filter has a second succession of stripes aligned parallel to said vertical dimension and spaced at double said fixed interval, said second succession of stripes alternately passing and rejecting a second color and in registry with said first succession of stripes to form a composite color filter having a four stripe differentiated, repeating sequence, and wherein
   B. said color processor has a network for obtaining an electrical signal corresponding to said second color comprising:
      (1) means coupled to said output means for additively combining the electrical signal from the first two sensors beneath the first two stripes of each four stripe sequence to form a first value and additively combining the electrical signal from the second two sensors beneath the second two stripes of each four stripe sequence to form a second value, repeating said two additions in each four stripe sequence, and then subtractively combining the first value with the second value in each four stripe sequence to form a quantity corresponding to said second color.

7. A solid state color camera as set forth in claim 6 wherein:
   A. the signals are derived sequentially by said output means from said sensor elements two elements at a time, signals from odd sensor elements being coupled to a first output terminal and signals from even sensor elements being coupled to a second output terminal, and wherein
   B. (1) the additive means of said color processor are coupled respectively to said first and second output terminals of said output means, and wherein
      (2) said color processor also includes
         (a) delay means coupled to the output of said additive means to delay the signal from each pair of sensors into time coincidence with the later signal from the adjacent following pair of sensors, and
         (b) means for subtractively combining the delayed and undelayed signal to form a quantity corresponding to said second color.

8. A solid state color camera as set forth in claim 7 wherein:
  A. the output of said subtractive means is an ac quantity whose amplitude is equal to the difference between said values, and
  B. means are provided for detecting the amplitude of said ac wave to obtain the voltage proportional to said second primary color.

9. A solid state color camera as set forth in claim 8 wherein:
  A. said first color passing stripe is clear and said first color rejecting stripe rejects red, and
  B. said second color passing stripe is clear and said second color rejecting stripe rejects blue.

10. A solid state color camera as set forth in claim 9 wherein one position in each four stripe sequence rejects red and blue, and effectively passes green, and wherein
  A. said color processor comprises a network for obtaining an electrical signal corresponding to green, which selects only the electrical signal from a sensor beneath said green pass position, repeating said selection in each four stripe sequence.

11. A solid state color camera as set forth in claim 10 wherein said processor includes a network for obtaining a luminance signal comprising:
  A. means for additively combining the electrical signal from a sensor beneath a clear stripe with the electrical signal from a sensor beneath a blue rejecting stripe in the same four stripe sequence,
  B. means for delaying one of said two signals prior to said combination by one-half the scanning rate,
  C. means for additively combining the electrical signal from a sensor beneath a blue rejecting stripe with the signal from a sensor beneath a blue and red rejecting stripe in the same four stripe sequence,
  D. means for delaying one of said two signals prior to said combination by one-half the scanning rate, and
  E. means for repeating said two additive combinations in each four stripe sequence to form a first luminance signal.

12. A solid state camera as set forth in claim 11 wherein:
  A. three low pass filters are provided respectively for said first, second and third color signals having a common higher frequency cutoff, and a filter is provided for said luminance signal having a low cutoff frequency near said higher cutoff frequency, and
  B. three adders are provided for adding said luminance signal to each of said color signals, said color signals being derived from the outputs of said last recited adders.

13. A solid state color camera as set forth in claim 9 wherein said processor includes a network for correction of non-blue transients in the network for obtaining a blue signal, said correction network comprising:
  A. means for additively combining the electrical signal from a sensor beneath a clear stripe with the electrical signal from a sensor beneath a red rejecting stripe in the same four stripe sequence and for additively combining the electrical signal from a sensor beneath a blue rejecting stripe with a sensor beneath a blue and red rejecting stripe in said same sequence and repeating said two additions in each sequence to form a wave having a dc value when non-blue signals are present,
  B. means to delay said wave having a dc value a period equal to twice the horizontal element scanning period,
  C. means for subtractively combining said delayed and said undelayed wave to obtain a correction transient simultaneous with that appearing in the blue channel, and
  D. means to combine said correction transient with said blue signal prior to application to said detection means in a sense to cancel said non-blue transient.

14. A solid state color camera as set forth in claim 13 wherein said processor includes a network for correction of an undesired blue stripe modulation in the network for obtaining a luminance signal, said blue stripe modulation producing a reduction in luminance corresponding to the sensor beneath a blue rejecting stripe and the sensor beneath a blue and red rejecting stripe, but no blue reduction in the sensor beneath a clear stripe or the sensor beneath a red rejecting stripe, said characteristic being repeated in each four stripe sequence, said correction network comprising:
  A. means for obtaining a correction signal proportional to the blue ac signal from said blue signal network,
  B. means to apply said correction signal to said odd and even sensor outputs prior to coupling to said luminance network to cancel said blue stripe modulation in said luminance output.

15. A solid state color camera comprising:
  A. a color filter having
    (1) a first succession of stripes aligned parallel to a vertical dimension and spaced at a fixed interval, said stripes alternately passing and rejecting red,
    (2) a second succession of stripes aligned parallel to said vertical dimension and spaced at double said fixed interval, said second succession of stripes alternately passing and rejecting blue, and in registry with said first succession of stripes to form a composite color filter having a four stripe color differentiated, repeating sequence in which
    (3) one position in each four stripe sequence rejects red and blue, and effectively passes green,
  B. a solid state imaging device including:
    (1) an area array of image sensors, arranged in rows and columns, said columns of sensors being aligned parallel to said vertical filter dimension at said fixed filter stripe interval, and in registry with said filter stripes, and
    (2) output means coupled to said area array for deriving signals from said individual sensors at a given periodic rate, and
  C. a color processor coupled to said output means comprises a network for obtaining an electrical signal corresponding to green which selects only the electrical signal from a sensor beneath said green pass position, repeating said selection in each four stripe sequence.

* * * * *